(12) United States Patent
Turner

(10) Patent No.: US 10,993,421 B2
(45) Date of Patent: *May 4, 2021

(54) FLEXIBLE SWIVEL

(71) Applicant: Turner Tackle LLC, Chestertown, MD (US)

(72) Inventor: James Norris Turner, Chestertown, MD (US)

(73) Assignee: Turner Tackle LLC, Chestertown, MD (US)

( * ) Notice: Subject to any disclaimer, the term of this patent is extended or adjusted under 35 U.S.C. 154(b) by 342 days.

This patent is subject to a terminal disclaimer.

(21) Appl. No.: 16/249,989

(22) Filed: Jan. 17, 2019

(65) Prior Publication Data

US 2019/0380319 A1  Dec. 19, 2019

Related U.S. Application Data

(60) Provisional application No. 62/685,136, filed on Jun. 14, 2018.

(51) Int. Cl.
*A01K 83/06* (2006.01)
*A01K 91/04* (2006.01)

(52) U.S. Cl.
CPC .............. *A01K 83/06* (2013.01); *A01K 91/04* (2013.01)

(58) Field of Classification Search
CPC ......... A01K 83/06; A01K 91/03; A01K 91/04
See application file for complete search history.

(56) References Cited

U.S. PATENT DOCUMENTS

| 608,348 | A | * | 8/1898 | Stadel | A01K 83/06 |
| | | | | | 43/44.6 |
| 1,766,532 | A | | 6/1930 | Pflueger | |
| 1,946,641 | A | | 2/1934 | Sisco | |
| 2,313,647 | A | | 3/1943 | Knill | |
| 2,766,545 | A | | 10/1956 | Wimer | |
| 3,057,110 | A | * | 10/1962 | Michael | A01K 95/00 |
| | | | | | 43/44.97 |
| 3,092,412 | A | | 6/1963 | Drake | |
| 3,335,472 | A | * | 8/1967 | Shigemi | A01K 91/04 |
| | | | | | 24/601.1 |
| 3,341,966 | A | | 9/1967 | Pippen | |
| D211,990 | S | | 8/1968 | Smith | |
| 3,750,240 | A | * | 8/1973 | Fridrich | A01K 91/04 |
| | | | | | 24/601.1 |
| 4,215,505 | A | | 8/1980 | Henze et al. | |
| 4,389,805 | A | * | 6/1983 | Hargrave | A01K 95/00 |
| | | | | | 43/43.14 |

(Continued)

FOREIGN PATENT DOCUMENTS

| GB | 2 355 636 A | 5/2001 |
| KR | 100920452 | 3/2007 |

OTHER PUBLICATIONS https://www.bdoutdoors.com/forums/threads/flat-fall-butterfly-and-knife-jigs.612560/.*

(Continued)

*Primary Examiner* — Richard G Davis
(74) *Attorney, Agent, or Firm* — Mark Nowotarski

(57) ABSTRACT

A flexible swivel has a flexible toroid described by an internal major diameter, a fore ring, a body, and an aft ring. The flexible toroid is attached to the fore ring. The fore ring is attached with a rotatable fore joint to the front of the body. The aft ring is attached to the back of the body.

6 Claims, 5 Drawing Sheets

(56) References Cited

U.S. PATENT DOCUMENTS

| | | | | |
|---|---|---|---|---|
| 4,744,167 | A * | 5/1988 | Steele | A01K 85/02 43/42.06 |
| 4,798,022 | A | 1/1989 | Rhoades | |
| D346,423 | S | 4/1994 | Kitagawa | |
| 5,531,042 | A * | 7/1996 | Rinker | A01K 95/00 43/42.06 |
| D393,688 | S | 4/1998 | Essad | |
| 5,781,972 | A | 7/1998 | Steed | |
| 5,887,381 | A | 3/1999 | Stephenson | |
| 6,601,336 | B1 | 8/2003 | Link | |
| 6,622,420 | B1 * | 9/2003 | Pinson | A01K 95/00 43/43.1 |
| 6,948,275 | B1 | 9/2005 | Lehmann | |
| D624,986 | S | 10/2010 | Sim | |
| 7,980,021 | B2 * | 7/2011 | Siatkowski | A01K 83/06 43/44.6 |
| D645,933 | S | 9/2011 | Henry, Jr. | |
| D697,165 | S | 1/2014 | Lorentz | |
| 9,010,015 | B2 | 4/2015 | Lorentz | |
| D744,607 | S | 12/2015 | Bennis | |
| D816,184 | S | 4/2018 | Kim | |
| D816,185 | S | 4/2018 | Kim | |
| D874,085 | S | 1/2020 | Guidry | |
| 2003/0159332 | A1 * | 8/2003 | Crochet | A01K 95/005 43/44.87 |
| 2005/0204608 | A1 | 9/2005 | Lehmann | |
| 2006/0070291 | A1 | 4/2006 | Pomeroy | |
| 2006/0156612 | A1 | 7/2006 | Brzozowski | |
| 2008/0066370 | A1 | 3/2008 | Wichern | |
| 2011/0016768 | A1 | 1/2011 | Tarquini | |
| 2011/0041379 | A1 | 2/2011 | Salomon et al. | |
| 2012/0023806 | A1 | 2/2012 | Henry, Jr. | |

OTHER PUBLICATIONS

Miscellaneous Internet Images, last viewed Dec. 13, 2018
English Translation of KR 100920452, Apparatus and method for sensing bobber, last viewed Dec. 13, 2018.
O-Ring Durometer Chart, https://www.theoringstore.com/index.php?main_page=page&id=7, last viewed Dec. 28, 2018.
Ringer Swivels™ Testimonials, https://www.ringerswivels.com/testimonials/, last viewed Dec. 29, 2018.
En.wikipedia.org, Torus, https://en.wkipedia.org/wiki/Torus, last viewed Dec. 18, 2018
O-Ring Circle Hook Ballyhoo Rig, http://www.fishtrack.com/how-to/o-ring-circle-hook-ballyhoo-rig_106330, last viewed Dec. 3, 2018
Rigger's Corner, https://www.pressreader.com/usa/marlin/20181001/281582356493945, last viewed Nov. 29, 2018
Capt. John Galvin, The Three Ballyhoo Rigs Every Offshore Fisherman Should Know dated Aug. 11, 2014, https://www.onthewater.com/three-ballyhoo-rigs-every-offshore-fisherman-know, last viewed Dec. 3, 2018.
Amazon.com; Ringer Swivels | Circle Hook Fising Swivel; https://www.amazon.com/Ringer-Swivels-Circle-Fishing-Swivel/dp/B07FRZPQST/?th=1; last viewed Jun. 29, 2020.
Northland Fishing Tackle, "Swivel-Head Jig", https://shop.northlandtackle.com/jigs/swivel-head-jig/, last viewed Apr. 10, 2020.
Cabela's, "Sampo Lock Snap Swivels—Nickel", https://www.cabelas.com/product/Sampo-Lock-Snap-Swivels-Nickel/702233.uts?productVariantId=1228807&WT.tsrc=PPC&WT.mc_id=GoogleProduct%E2%80%A6, last viewed Mar. 31, 2020.
"Double Wacky Hook, have you seen it yet!!", https://www.westernbass.com/forum/double-wacky-hook-have-you-seen-yet-t75178.html, last viewed Mar. 31, 2020.
"Spro Ball Bearing Swivel with Split Ring-Pack of 5", https://www.amazon.com/dp/B000ALGHLK/ref=cm_sw_r_cp_api_i_WSKGEbA53F7PA, last viewed Mar. 31, 2020.
"Gerry Rig", http://livebaitclip.com/, last viewed Mar. 28, 2020.
"Silver Tone Metal 5mm Eyelet Barbed Pointed Fishing Hook Fishhook", https://www.newegg.com/p/0GC-00B7-000X7, last viewed Mar. 28, 2020.
Cabela's "VMC 7548BD Bladed Hybrid 1X Short Treble Hook", https://www.cabelas.com/product/VMC-Bladed-Hybrid-Treble-Short-X/3414067.uts?productVariantId=6773816&WT.tsrc=PPC&WT.mc_id=Go%E2%80%A6, last viewed Apr. 13, 2020.
InTheBite The Professionals' Sportfishing Magazine, "Increase Your Hook-Up Ratio! Ringer Swivels are Game Changers", Sep. 2018, last viewed Apr. 21, 2020.
BlueWater, "Rapid bait-changes & better hook-ups", Issue 137, last viewed Apr. 20, 2020.
Florida Sport Fishing, May/Jun. 2019, Baitfish Profiles, A New Spin, "Rigging the Perfect Pitch Bait", last viewed Apr. 20, 2020.
Marlinmag.com, "The Circle-Hook Revolution", Mar. 2019, last viewed Apr. 20, 2020.
Marlinmag.com, "Crazy Days in Cape Verde", "Dead-Bait Updates", Oct. 2018, last viewed Apr. 20, 2200.
The Hull Truth—Boating and Fishing Forum, "Ringer Swivels—Circle Hook Marlin fishing!!", dated May 26, 2018, "The Circle-Hook Revolution", https://www.thehulltruth.com/fishing-miscellaneous-items-commercial-sellers-only/933919-ringer-swivels-circle-hook-marlin-fishing.html?styleid=9, last viewed Apr. 21, 2020.
Big Game Fishing Journal, "Ringer Swivels", dated Sep./Oct. 2018, last viewed Apr. 20, 2020.
Greentree Information Service, LLC; Patent Search Report for Invention: Fishing Line Swivel dated Apr. 19, 2020; last viewed Apr. 20, 2020.
EBay, 11 Size Fishing Barrel Bearing Swivel Stainless Steel Solid Ring Connector 100pc, https://www.ebay.com/itm/11-Size-Fishing-Barrel-Bearing-Swivel-Stainless-Steel-Solid-Ring-Connector-100pc-/371669117319?_trksid=p2385738.m43%E2%80%A6, last viewed May 6, 2020.
Merriam-Webster Definition of Split Ring https://www.merriam-webster.com/dictionary/split last viewed Feb. 24, 2021.

* cited by examiner

FLEXIBLE SWIVEL

COPYRIGHT AND TRADEMARK NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

FIELD OF THE INVENTION

Embodiments of the present invention relate to swivels used in fishing or for other purposes.

BACKGROUND OF THE INVENTION

An effective way to fish for offshore game fish, such as marlin, is to use a ballyhoo fishing rig. There are two basic types of ballyhoo rigs described in the prior art: a ballyhoo O-ring rig; and a ballyhoo rigid swivel rig.

FIG. 1A is a photograph of the front end of a ballyhoo O-ring rig 100 from a top perspective. The O-ring rig comprises a leading hook 102, a flexible O-ring 104, a rigging wire 106 and a dead bait fish 108, such as a ballyhoo. The rigging wire passes through the O-ring and is wrapped around the head of the bait fish to secure it to the O-ring. The leading hook passes through the O-ring. The O-ring is described by an O-ring major internal diameter (ID) 116.

The leading hook comprises a shaft 122 and a barb 124. The shaft is described by a shaft outer diameter (OD) 114. The barb is described by a barb span 112.

The O-ring major ID is about the same as the shaft OD. The O-ring may fit snugly on the shaft. The O-ring must be flexible enough so that it can stretch under the force a typical person can produce with their hand so that the O-ring will fit over the barb span when the hook is placed through the O-ring major ID.

One of the disadvantages of the O-ring rig is that when a game fish takes the bait and exerts force on the line attached to the hook, the hook may not be in the correct orientation to hook the game fish in its jaw. Thus, the rig may pop out of the fish's mouth. To overcome this problem, some anglers use a ballyhoo rigid swivel rig.

FIG. 1B is a photograph of a side view of the front of a prior art ballyhoo rigid swivel rig 120. The rigid swivel rig comprises a leading hook 102, a rigid swivel 122, a rigging wire 106 and a dead bait fish 108. The rigid swivel comprises a rigid fore ring 124, a body 126 and an aft ring 128. The fore ring is attached to the body of the swivel with a rotatable fore joint 125. The aft ring is attached to the body with a rotatable aft joint 127. The fore ring is described by a fore ring ID 132.

The aft ring is buried in the bait fish's upper lip and not visible. The rigging wire passes through the aft ring and is wrapped around the head of the bait fish. This may cause the body of the swivel to press against the upper lip of the bait fish thus not allowing the body of the swivel to rotate freely relative to the aft ring.

The leading hook passes through the fore ring. The fore ring ID must be slightly less than the barb span 112 of the hook so that the fore ring will "click" over the barb 124 when the hook is inserted through the fore ring. The fore ring ID, therefore is significantly larger than the shaft OD 114 of the hook shaft 122. The fore ring is rigid hence it fits loosely over the shaft and may come off in use. There is a need, therefore, for a swivel for use in fishing for game fish that is flexible enough to fit over the barb of a fore hook and make a snug fit with the shaft while still allowing said fore hook to rotate freely relative to the bait fish and hence properly catch said game fish's jaw when said game fish takes the bait.

SUMMARY OF THE INVENTION

The summary of the invention is provided as a guide to understanding the invention. It does not necessarily describe the most generic embodiment of the invention or the broadest range of alternative embodiments.

FIG. 2 is a perspective rendering of a flexible swivel 200 suitable for use in a ballyhoo fishing rig. FIG. 3 is a longitudinal cross section perspective rendering of the flexible swivel 200 of FIG. 2. Referring to FIGS. 2 and 3, the flexible swivel comprises:
 a) a flexible toroid 202 described by a major internal diameter 308;
 b) a fore ring 204;
 c) a body 206; and
 d) an aft ring 208
wherein:
 e) said flexible toroid is attached to said fore ring;
 f) said fore ring is attached to the front 214 of said body with a rotatable fore joint 205; and
 g) said aft ring is attached to the back 216 of said body. The aft ring may be attached to the body with either a rotatable aft joint 207, or a non-rotatable aft joint (not shown).

A used herein, a toroid is any object with a hole in it. A regular toroid is a toroid whose surface is described by the circular revolution of a circle. An irregular toroid is a toroid whose surface departs from a circular revolution of a circle.

Toroid 202 is a regular toroid. It may be described by a major ID 308 and a minor OD 304. The toroid may comprise a flexible material. The flexible material may be an elastomer, such as rubber, nitrile, or silicon rubber. A suitable durometer of said flexible material may be about 70 Shore A. A suitable durometer may be in the range of 60 to 90 Shore A.

The major ID, minor ID and elastomer may be selected such that the flexible toroid will stretch to pass over the barb of a hook and then relax to a major ID that is about the same as the OD of a hook shaft. Thus, the flexible toroid will fit snugly on said shaft. When the flexible swivel is used in a ballyhoo rig, it will have the surprising combined benefits of an O-ring rig and a rigid swivel rig. The flexible swivel can be used in any application where the toroid must stretch and fit over an object and still rotate relative to the body of said flexible swivel.

DETAILED DESCRIPTION

The detailed description describes non-limiting exemplary embodiments. Any individual features may be combined with other features as required by different applications for at least the benefits described herein. As used herein, the term "about" means plus or minus 10% of a given value unless specifically indicated otherwise.

As used herein, the term "shaped" means that an item has the overall appearance of a given shape even if there are minor variations from the pure form of said given shape.

As used herein, the term "generally" when referring to a shape means that an ordinary observer will perceive that an object has said shape even if there are minor variations from said shape.

As used herein, relative orientation terms, such as "up", "down", "top", "bottom", "left", "right", "vertical", "horizontal", "distal" and "proximal" are defined with respect to an initial presentation of an object and will continue to refer to the same portion of an object even if the object is subsequently presented with an alternative orientation, unless otherwise noted.

Method of Manufacture

Figure 1A:
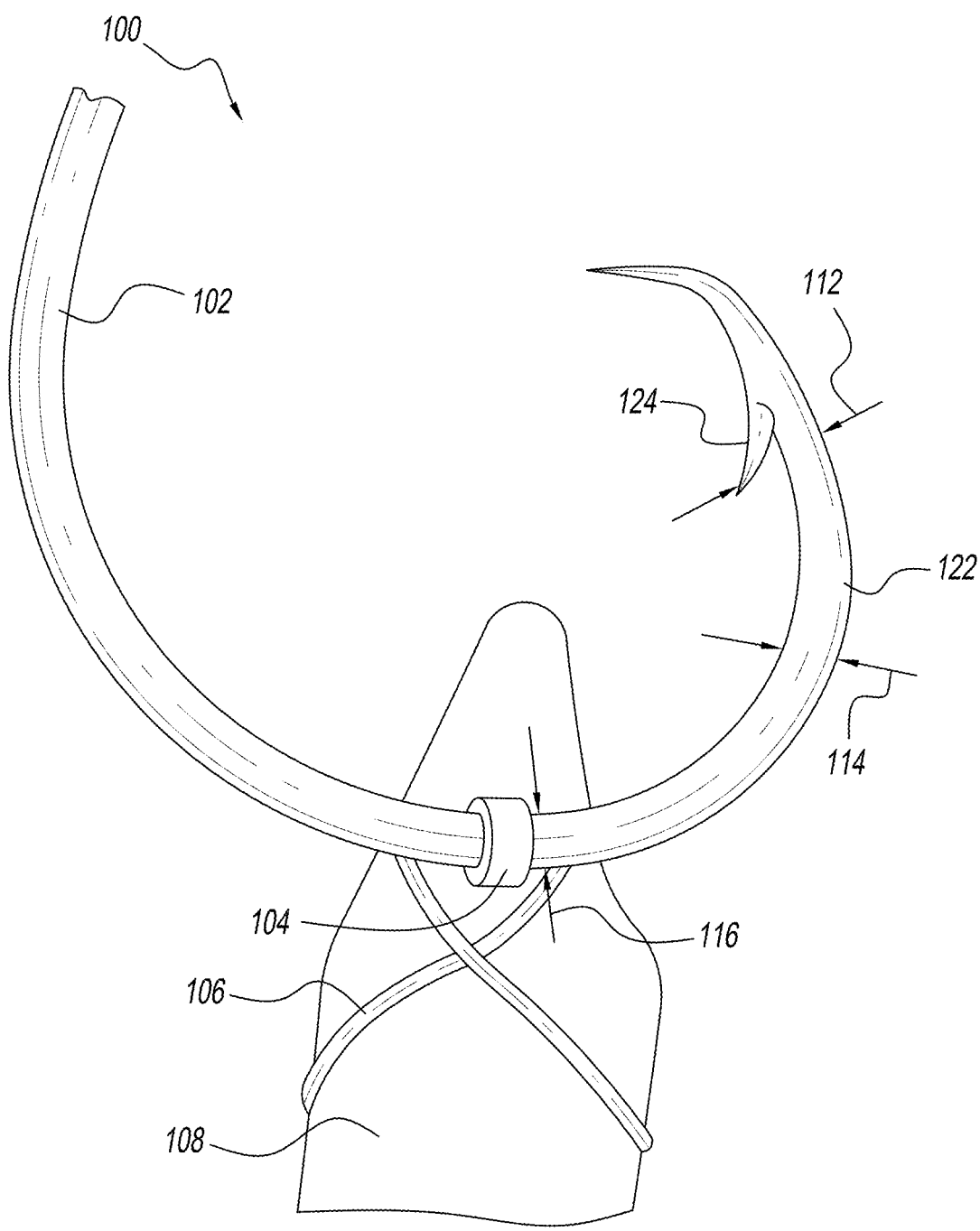
FIG. 1A is a photograph of a top view of the front of a prior art O-ring ballyhoo rig.
Figure 1B:
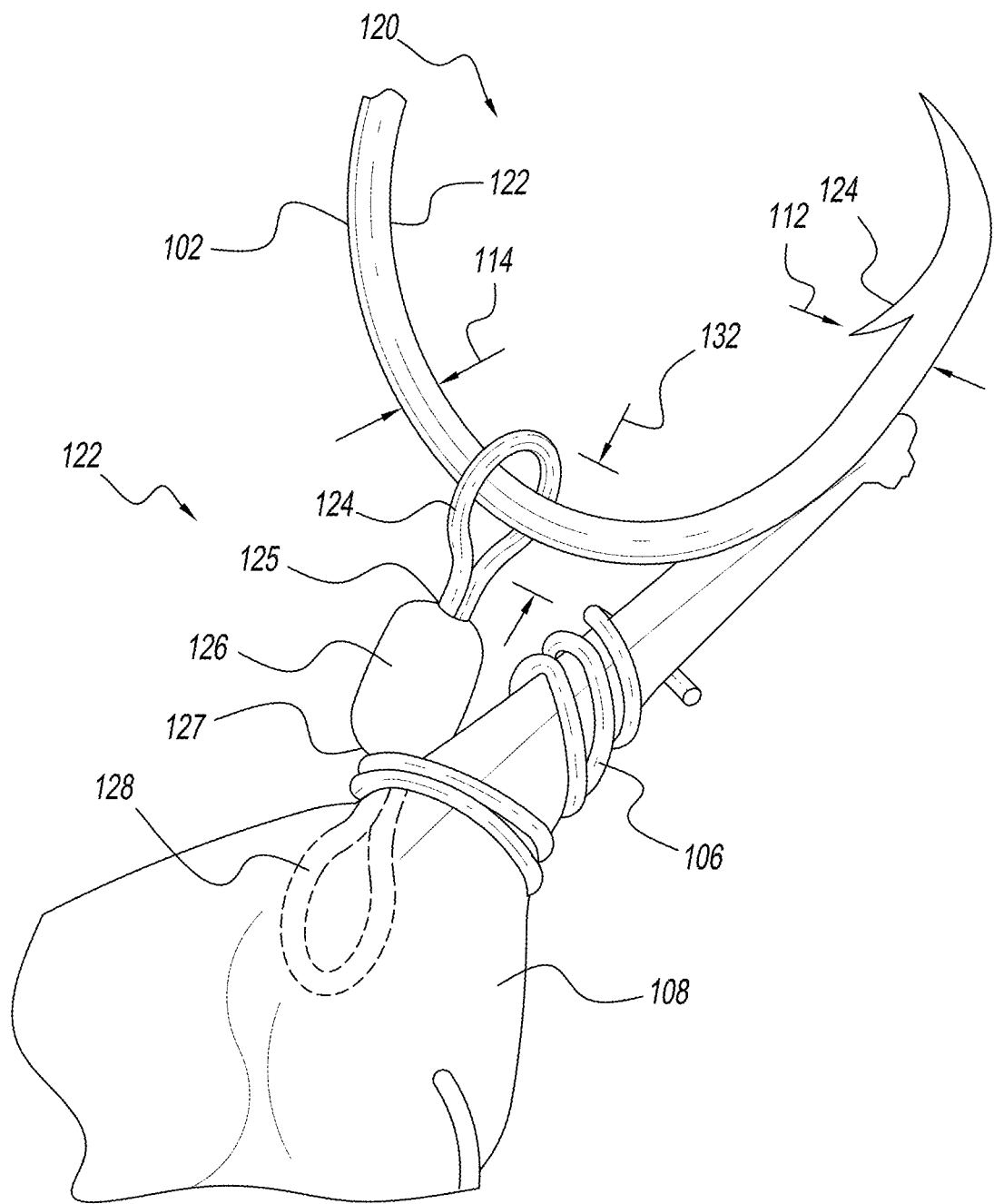
FIG. 1B is a photograph of a side view of the front of a prior art rigid swivel ballyhoo rig.
Figure 2:
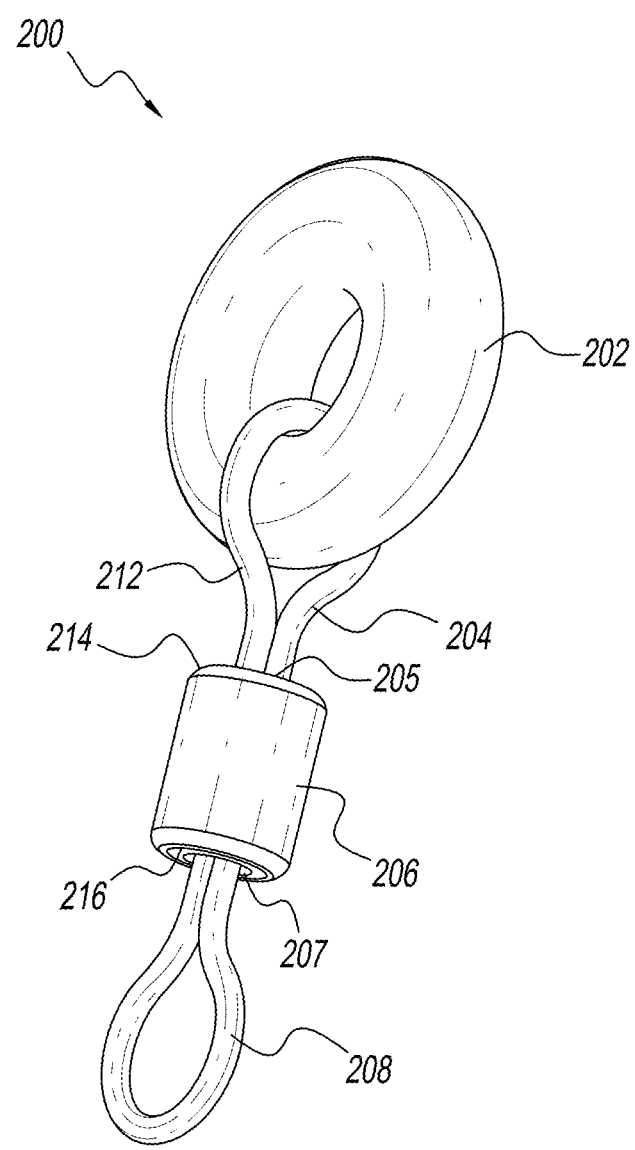
FIG. 2 is a rendering of a perspective view of a flexible swivel suitable for use in a ballyhoo fishing rig.
Figure 3:
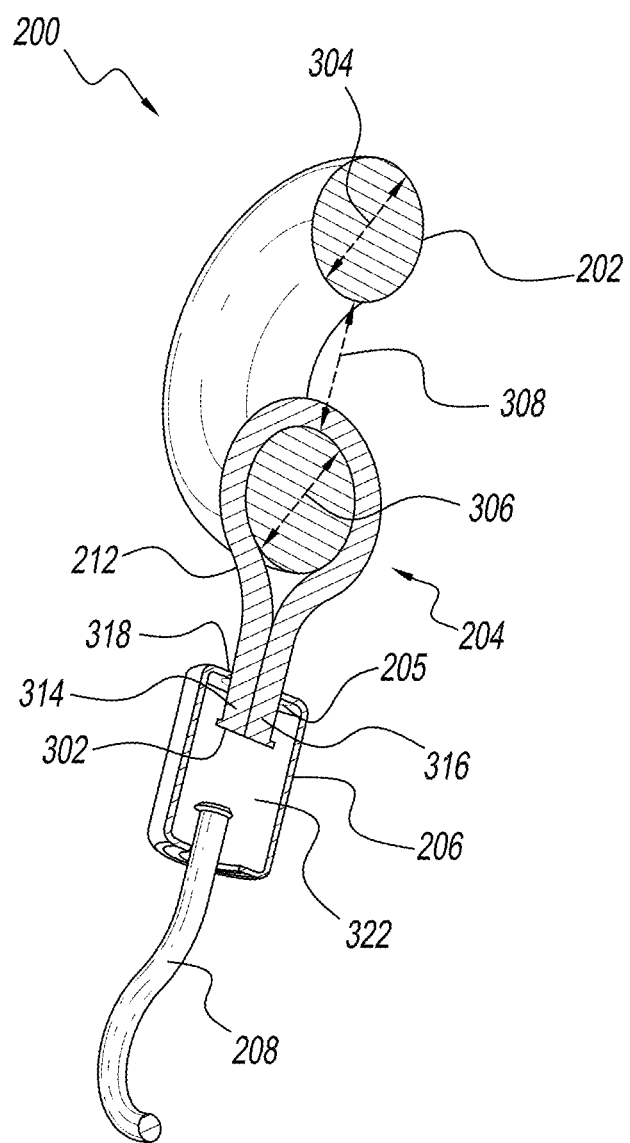
FIG. 3 is a rendering of a longitudinal cross section of a perspective view of the flexible swivel of FIG. 2.

Referring to FIGS. 3, a suitable method for manufacturing of a flexible swivel comprises the steps of:
 a) insert a fore ring wire 212 through a major internal diameter 308 of a flexible toroid 202, said fore ring wire comprising a first end 314 and a second end 316;
 b) insert said ends of said fore ring wire through a fore hole 318 of said body 206 and into an interior space 322 of said body; and
 c) swage 302 said ends of said fore ring wire so that said ends will form a rotatable fore joint 205 and remain inside said body when longitudinal tension is placed on said flexible swivel.

The fore ring may be sized such that the fore ring ID 306 is about the same as the minor ID 304 of the flexible toroid. A suitable dimension for the fore ring ID and toroid minor ID is about 10 mm. Other sizes may be used in other applications. A suitable toroid major ID is about 10 mm. Other sizes may be used in other applications.

In an alternative embodiment, the flexible toroid may be molded through the fore ring after the fore ring is formed. The flexible toroid may be made in a two-step double injection process.

Figure 4:
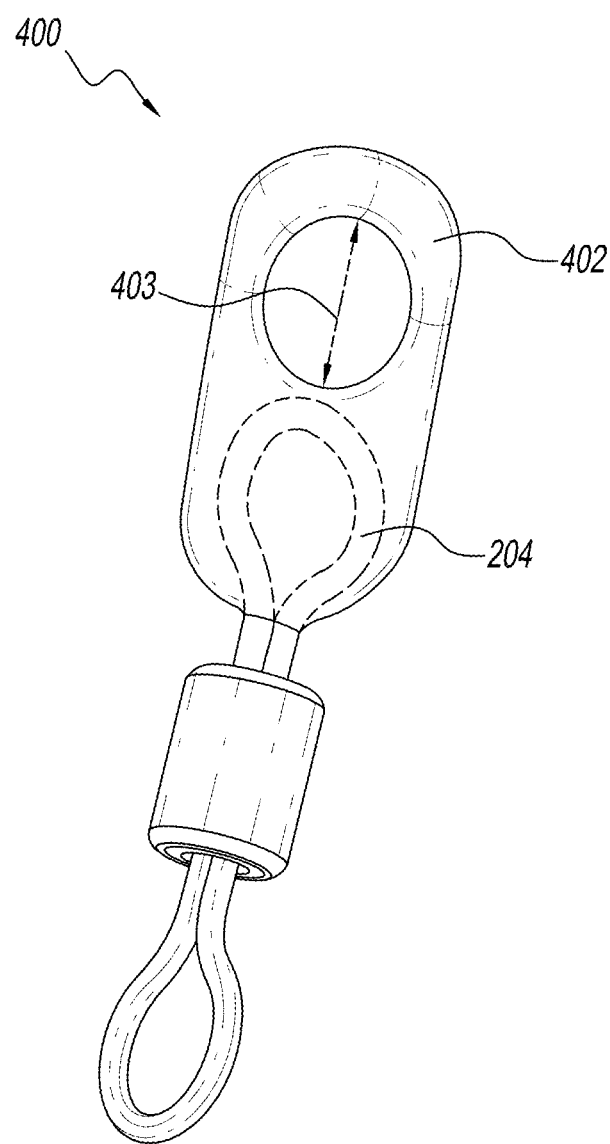
FIG. 4 is a rendering of a perspective view of a flexible swivel with an irregular flexible toroid.

Referring to FIG. 4, a flexible swivel 400 with an irregular flexible toroid 402 is formed by overmolding the irregular flexible toroid on to the fore ring 204 such that the toroid major ID 403 is forward of the fore ring.

CONCLUSION

While the disclosure has been described with reference to one or more different exemplary embodiments, it will be understood by those skilled in the art that various changes may be made and equivalents may be substituted for elements thereof without departing from the scope of the disclosure. In addition, many modifications may be made to adapt to a particular situation without departing from the essential scope or teachings thereof. For example, the flexible toroids described herein do not have to be circular. They can be any shape and dimensions that would flex to admit a hook and barb and then, once past the barb, form a snug fit with the shaft of the hook. Said shapes include square, oval, and any solid shape with an opening to admit the hook. Therefore, it is intended that the disclosure not be limited to the particular embodiment disclosed as the best mode contemplated for carrying out this invention.

I claim:

1. A flexible swivel suitable for use in a ballyhoo fishing rig comprising:
 a) a flexible elastomeric toroid described by a major internal diameter;
 b) a fore ring;
 c) a body; and
 d) an aft ring
wherein:
 e) said flexible elastomeric toroid is attached to said fore ring;
 f) said fore ring is attached to the front of said body with a rotatable fore joint; and
 g) said aft ring is attached to the back of said body.

2. The flexible swivel of claim 1 wherein said fore ring comprises a fore ring wire that passes through said major internal diameter of said flexible elastomeric toroid.

3. The flexible swivel of claim 2 wherein said fore ring is formed by steps comprising:
 a) insert a fore ring wire through said major internal diameter of said flexible elastomeric toroid, said fore ring wire comprising a first end and a second end;
 b) insert said ends of said fore ring wire through a fore hole of said body and into an interior space of said body; and
 c) swage said ends of said fore ring wire so that said ends will form said rotatable fore joint and remain inside said body when longitudinal tension is placed on said flexible swivel.

4. The flexible swivel of claim 2 wherein said flexible elastomeric toroid is formed by steps comprising:
 a) molding an elastomer through said fore ring.

5. The flexible swivel of claim 1 wherein said flexible elastomeric toroid is a regular toroid.

6. The flexible swivel of claim 1 wherein:
 a) said flexible elastomeric toroid is an irregular toroid; and
 b) said flexible elastomeric toroid is overmolded on to said fore ring.

* * * * *